US009334458B2

United States Patent
Harada et al.

(10) Patent No.: US 9,334,458 B2
(45) Date of Patent: May 10, 2016

(54) COMPLEX SYSTEM FOR UTILIZING COAL IN MANUFACTURE OF CHAR AND RAW MATERIAL GAS AND ELECTRIC POWER GENERATION

(75) Inventors: Tatsuro Harada, Fukuoka (JP); Seiichiro Matsuda, Fukuoka (JP); Isao Mochida, Fukuoka (JP); Jun-ichiro Hayashi, Fukuoka (JP); Yohsuke Matsushita, Fukuoka (JP); Tsuyoshi Yamamoto, Fukuoka (JP); Toshiro Noguchi, Fukuoka (JP)

(73) Assignees: KYUSHU ELECTRIC POWER CO., INC., Fukuoka-shi (JP); KYUSHU UNIVERSITY, NATIONAL UNIVERSITY CORPORATION, Fukuoka-shi (JP)

( * ) Notice: Subject to any disclaimer, the term of this patent is extended or adjusted under 35 U.S.C. 154(b) by 266 days.

(21) Appl. No.: 14/005,440

(22) PCT Filed: Mar. 15, 2012

(86) PCT No.: PCT/JP2012/056706
§ 371 (c)(1),
(2), (4) Date: Oct. 3, 2013

(87) PCT Pub. No.: WO2012/124765
PCT Pub. Date: Sep. 20, 2012

(65) Prior Publication Data
US 2014/0030155 A1  Jan. 30, 2014

(30) Foreign Application Priority Data

Mar. 15, 2011 (JP) .................................. 2011-057083

(51) Int. Cl.
*B01J 7/00* (2006.01)
*C10L 9/08* (2006.01)
(Continued)

(52) U.S. Cl.
CPC ... *C10L 9/08* (2013.01); *C10F 5/00* (2013.01); *C10J 3/48* (2013.01); *C10J 3/60* (2013.01);
(Continued)

(58) Field of Classification Search
CPC ................ C10L 9/00; C10J 2300/0909; C10J 2300/093; F02C 3/28
See application file for complete search history.

(56) References Cited

U.S. PATENT DOCUMENTS

| 5,554,201 A | 9/1996 | Yagaki et al. |
| 5,556,436 A | 9/1996 | Yagaki et al. |

(Continued)

FOREIGN PATENT DOCUMENTS

| DE | 48 389 A1 | 8/1966 |
| DE | 39 34 447 C2 | 4/1991 |

(Continued)

OTHER PUBLICATIONS

International Search Report Issued Apr. 24, 2012 in PCT/JP12/056706 Filed Mar. 15, 2012.

(Continued)

*Primary Examiner* — Imran Akram
(74) *Attorney, Agent, or Firm* — Oblon, McClelland, Maier & Neustadt, L.L.P.

(57) ABSTRACT

Most of the abundant naturally occurring low rank coal, which has a high moisture content and a high oxygen content, is transported with poor efficiency; utilized for heating with degraded thermal efficiency because of the loss of heat due to sensible heat for heating moisture and latent heat for vaporizing moisture; and utilized in existing coal combustion facilities with difficulty due to a high volatile component content. A complex system of the present invention for utilizing coal for manufacture of char and raw material gas and electric power generation is adopted to include: a drying unit for drying low rank coal of a high moisture content; a reformer for reforming the low rank coal that has been dried in the drying unit; a fluidized bed combustor for employing, as a fuel, the reformed coal obtained in the reformer; a producer gas supply pipe for supplying a combustion exhaust gas from the fluidized bed combustor as a pyrolytic and gasifying agent to the reformer; and a catalyst reforming unit for reforming a volatile component and the producer gas obtained from the low rank coal reformed in the reformer.

5 Claims, 3 Drawing Sheets

(51) Int. Cl.
*C10J 3/48* (2006.01)
*C10J 3/72* (2006.01)
*C10J 3/60* (2006.01)
*C10F 5/00* (2006.01)

(52) U.S. Cl.
CPC .......... *C10J 3/721* (2013.01); *C10J 2300/1612* (2013.01); *C10J 2300/1671* (2013.01); *C10J 2300/1815* (2013.01); *C10J 2300/1853* (2013.01); *Y02E 20/18* (2013.01); *Y02E 20/185* (2013.01)

(56) References Cited

U.S. PATENT DOCUMENTS

| | | | | |
|---|---|---|---|---|
| 2004/0045272 | A1* | 3/2004 | Miyoshi | C10J 3/463 60/39.12 |
| 2007/0094929 | A1* | 5/2007 | Kang | C10J 3/54 48/111 |
| 2009/0084666 | A1* | 4/2009 | Agrawal | C10B 49/22 201/2.5 |
| 2009/0263316 | A1* | 10/2009 | Iyer | C01B 3/38 423/658.3 |
| 2009/0265987 | A1* | 10/2009 | Xu et al. | 48/89 |
| 2010/0018117 | A1* | 1/2010 | Zhou | C10J 3/485 48/77 |
| 2010/0175364 | A1 | 7/2010 | Yamamoto et al. | |
| 2012/0039430 | A1* | 2/2012 | Abel | E21B 43/2403 376/325 |
| 2013/0239479 | A1* | 9/2013 | Gao | C10B 49/10 48/89 |

FOREIGN PATENT DOCUMENTS

| | | |
|---|---|---|
| DE | 10 2008 027 858 A1 | 12/2009 |
| JP | 7 188677 | 7/1995 |
| JP | 7 233384 | 9/1995 |
| JP | 8 283749 | 10/1996 |
| JP | 2776278 | 7/1998 |
| JP | 11 279567 | 10/1999 |
| JP | 2003 3860 | 1/2003 |
| JP | 2009 133268 | 6/2009 |
| JP | 2010 144094 | 7/2010 |

OTHER PUBLICATIONS

Office Action issued Dec. 2, 2015 in German Patent Application No. 11 2012 001 242.9 (with English language translation).

* cited by examiner

COMPLEX SYSTEM FOR UTILIZING COAL IN MANUFACTURE OF CHAR AND RAW MATERIAL GAS AND ELECTRIC POWER GENERATION

TECHNICAL FIELD

The present invention relates to a complex system which is capable of merging electric power generation and coal chemistry so as to utilize coal, the coal being highly utilized as heat, electricity, and a chemical raw material, for manufacture of char and raw material gas and electric power generation. This is achieved by reforming dried low rank coal, while being moved in a moving bed reformer, and pyrolyzing and gasifying the resulting dried low rank coal by the combustion heat and exhaust gas from a fluidized bed combustor (FBC) so as to obtain hydrocarbon gas and char. At the same time, electric power is generated by recycling heat with steam from the fluidized bed combustor where the char and the dried low rank coal are present. Furthermore, the reformed char may be used as a fuel for electric power generation and a heat source for steelmaking. On the other hand, the hydrocarbon gas is used as a chemical raw material.

BACKGROUND ART

The low rank coal, such as subbituminous coal or brown coal, which has a moisture content higher than about 20 mass % is limited to use within a coal-producing region. This is because, for example, the low rank coal has a low calorie resulting from its high moisture content and generates a small amount of heat by combustion. On the other hand, when dried, the low rank coal becomes more spontaneously combustible and more hygroscopic, resulting in transportation costs being relatively expensive, etc.

However, the low rank coal has advantages that are not found, e.g., in the bituminous coal that is considered to be a high rank coal. For example, brown coal found in Australia and Indonesia is low in sulfur content and produces less ash. Thus, using the brown coal as a fuel would make it possible to prevent air pollution due to sulfur dioxide gas, etc., as well as to reduce hazardous ash waste.

In this context, such techniques have been suggested which are adopted to carbonize the low rank coal by dehydration reform or thermal reform, thereby compensating for the drawbacks thereof. For example, disclosed in Patent Literature 1 and Patent Literature 2 is a technique by which oil and low rank coal are mixed into raw material slurry; the resulting slurry is heated and dehydrated in the oil, and then further heated to decompose or detach the carboxyl radical or the hydroxyl radical, etc., in the raw material coal by a decarboxylation reaction or a dehydration reaction, thereby reforming the raw material coal. Also disclosed is a technique by which heavy oil, etc., is penetrated into pores of the low rank coal so as to prevent spontaneous combustion.

On the other hand, disclosed in Patent Literature 3 is a coal gasification complex power generation facility which includes the following: a gasification unit for gasifying low rank coal having a relatively high moisture content; a gas power generation unit for generating electric power using a gas supplied from the gasification unit; a steam power generation unit for generating electric power by the heat of an exhaust gas emitted from the gas power generation unit; and a coal drying unit for drying coal by the exhaust heat emitted from the steam power generation unit and supplying the dried coal to the gasification unit. Disclosed in Patent Literature 4 is a method for manufacturing reformed coal and hydrocarbon oil by pyrolyzing brown coal into reformed coal and tar under an inert gas atmosphere or steam atmosphere and catalytically cracking the tar in a steam atmosphere and in the presence of an iron-based catalyst so as to obtain hydrocarbon oil.

CITATION LIST

Patent Literature

PTL 1: Japanese Published Unexamined Patent Application No. H07-233384
PTL 2: Japanese Patent No. 2776278
PTL 3: Japanese Published Unexamined Patent Application No. 2009-133268
PTL 4: Japanese Published Unexamined Patent Application No. 2010-144094

SUMMARY OF INVENTION

Technical Problem

However, the aforementioned conventional techniques had the following problems:

(1) For Patent Literatures 1 and 2, the use of oil requires various types of facilities for separating oil and coal in the same container, causing an increase in the size of the system and impairing energy-saving efficiency;

(2) The oil or an indirect material is required for the reforming of the coal, thereby causing a significant increase in costs and imposing a high environmental load;

(3) The method which employs the oil causes a heat exchange loss of the energy provided for the brown coal, thus leading to a significant energy loss;

(4) Furthermore, the oil used as an indirect material is mixed into the dried coal, thus causing a high loss of oil and impairing resource-saving efficiency;

(5) For Patent Literature 3, since the low rank coal is dried and then gasified in a gasification furnace so as to be combusted as a heat source in a boiler, it is possible to obtain a high calorie, but effective use would not be made of a useful chemical raw material contained in the low rank coal, thus impairing resource-saving efficiency;

(6) Patent Literature 3 is based on the high-temperature gasification of coal, so that the gas component after gasification is predominantly composed of low molecular-weight compounds and thus disadvantageous to subsequent chemical product synthesis;

(7) Patent Literature 3 has a significant restriction on the materials that form the facility because the gases are produced at high temperatures;

(8) For Patent Literature 4, the brown coal is pyrolyzed at 500° C. to 800° C. to obtain the reformed coal and the tar, and then the tar is catalytically cracked at 400° C. to 600° C. to thereby obtain the reformed coal and a compound. However, in general, when the low rank coal is heated above 500° C., cracks are increased and fine powder is produced, causing unburned coal to increase. Furthermore, since the pyrolysis gas may cause dangers of easily igniting combustible components or explosion of the powdered coal in a high oxygen concentration, there is a lack of safety and operability because it is difficult to control the operations of the system such as the control of oxygen concentration or addition of steam; and (9) For Patent Literature 4, energy-saving efficiency is impaired because cooling is required when the brown coal is used as the reformed coal or when the powdered coal is combusted in a downstream stage.

The present invention was developed to solve the aforementioned conventional problems. It is therefore an object of the invention to provide a complex system for utilizing coal for manufacture of char and raw material gas and electric power generation, the complex system being adopted as follows:

(1) To utilize the combustion heat of fixed carbon of coal so as to heat the steam for electric power generation as well as to pyrolyze and gasify the low rank coal and manufacture char;

(2) To be capable of making the boiler more compact by employing oxygen fluidized-bed combustion;

(3) To be capable of reducing the separation energy of carbon dioxide gas, when the carbon dioxide gas is separated and recycled, by employing oxygen combustion because nitrogen gas is considerably reduced and thus carbon dioxide gas is high in concentration;

(4) To be capable of constructing a chemical complex which makes effective use of the exhaust heat from the boiler so as to use a pyrolysis gas and a gasified gas (volatile component) as a chemical raw material;

(5) To employ a moving bed reactor as the reformer, whereby the temperature of the product gas may be kept reduced and thus fewer restrictions are imposed on materials such as those for gas pipes, thereby providing outstanding maintainability;

(6) To be capable of reducing the temperature of product gas since a long pyrolysis reaction time is available, so that troubles due to a tar component (such as adhesion or caulking) may be solved and a large amount of relatively long-chain hydrocarbon components may be obtained, producing a gas that is advantageous for combustion and chemical synthesis;

(7) To charge the fixed carbon with the volatile component removed into an oxygen fluidized bed combustor without cooling the fixed carbon, thus achieving a high ignition quality and an outstanding energy-saving efficiency; and (8) To be capable of combusting oxygen since high-temperature fixed carbon (char) with volatile components removed may be charged into the oxygen fluidized bed combustor from a portion of a low oxygen concentration in a counter flow relative to the combustion exhaust gas, whereby abnormal combustion or sudden combustion immediately after the charging may be suppressed even in the combustor of a high oxygen concentration.

Solution to Problem

To solve the aforementioned conventional problems, a complex system of the present invention for utilizing coal for manufacture of char and raw material gas and electric power generation is arranged as follows.

A complex system according to a first aspect of the present invention for utilizing coal for manufacture of char and raw material gas and electric power generation includes the following: a drying unit for drying low rank coal of a high moisture content; a reformer for reforming the low rank coal that has been dried in the drying unit; a fluidized bed combustor for employing, as a fuel, the reformed coal obtained in the reformer; a producer gas supply pipe for supplying a combustion exhaust gas from the fluidized bed combustor as a pyrolytic and gasifying agent to the reformer; and a catalyst reforming unit for reforming a volatile component and the combustion exhaust gas obtained from the low rank coal reformed in the reformer.

This arrangement may provide the following operations:

(1) Since the low rank coal is dried in the drying unit before being supplied to the reformer, even using the low rank coal as a fuel for the fluidized bed combustor may allow for preventing loss of heat energy that may be caused by vaporization of the contained moisture or removal of heat due to a leak of the steam, etc.;

(2) Heat energy may be used with improved efficiency because the exhaust gas emitted from the fluidized bed combustor is employed for drying the low rank coal. On the other hand, when compared with the case where an additional heat generating unit for generating heat is provided for dry the low rank coal, there is no need to supply an additional fuel or energy, thus achieving an outstanding energy-saving efficiency;

(3) Since the reformer is heated with the exhaust gas in the fluidized bed combustor and reforms the low rank coal, an outstanding energy-saving efficiency is achieved;

(4) The low rank coal has a high volatile component content; however, the volatile component is emitted by the reformer and allowed to react with CO, $CO_2$, or $H_2O$ of the combustion gas in the gas reform unit in conjunction with a partially gasified gas, thereby allowing for utilizing the low rank coal as a useful chemical raw material;

(5) The char produced in a high temperature portion (inlet portion) in the reform unit may be utilized as raw material coal for steel making and a solid fuel that may be transported overseas, and as a fluidized bed fuel;

(6) Since the temperature of the producer gas (combustion exhaust gas) from the fluidized bed combustor is used for gas reform, an outstanding thermal efficiency and an outstanding energy-saving efficiency are achieved;

(7) Employing the moving bed reactor as the reformer achieves a product gas temperature of as low as 150° C. or less and prevents the condensation of the tar. Furthermore, the low temperatures will reduce restrictive conditions on the material such as for gas pipes, thus making it possible to reduce the costs for system construction and maintenance. Furthermore, low-speed heating may prevent the raw material coal from being powderized;

(8) Since employing the moving bed reactor as the reformer allows a low product gas temperature and an elongated pyrolysis reaction time, troubles resulting from the occurrence of tar components due to adhesion or caulking, etc., caused by the tar components will not occur, and a large amount of relatively long chain hydrocarbon components may be obtained. It is thus possible to produce gases that are advantageous for chemical raw materials;

(9) Since the fixed carbon with the volatile component removed in the reformer is charged into the oxygen fluidized bed combustor without cooling, a high ignition quality is achieved and no energy loss results;

(10) In the fluidized bed combustor, heat may be exchanged with efficiency between the exhaust gas of the fluidized bed combustor passing by against the body force of the particle bed and the particles;

(11) Since the high-temperature fixed carbon (char) with the volatile component removed is charged into the fluidized bed combustor from a portion of a low oxygen concentration, abnormal combustion or sudden combustion immediately after the charging may be suppressed, thus allowing oxygen combustion; and

(12) Since the exhaust gas has a lower oxygen concentration than air, the low rank coal that may be spontaneously oxidized and readily catch fire may be reformed at higher temperatures.

Here, (a) the low rank coal may not be limited to one of a specific name, such as subbituminous coal, lignite, or brown coal as long as the moisture content is above about 20 mass %. Furthermore, all coal to be used as a fuel need not be the low rank coal, but some high rank coal of a moisture content of below about 20 mass % may also be added.

(b) The drying unit is dried in the atmosphere of an inert gas such as a nitrogen gas at a low temperature (60° C. to 90° C.) and a low humidity (RH 70% to 0%). The inside of the drying unit is made up of a hot water (about 60° C. to 90° C.) pipe for warming the coal and a gas pipe for injecting a drying inert gas. Furthermore, the target moisture content of the low rank coal may be made 20 mass % or less. In the experiments, the moisture content was reduced to 16 mass %. This made the moisture content of the low rank coal one-third or less, thereby significantly improving transportation efficiency. Furthermore, using the char may prevent spontaneous combustion, thus achieving improved safety.

The nitrogen gas used is the one that is separated in an oxygen separator. The nitrogen gas may be heated in an air preheater which is heated with very hot water of the condenser. In this case, since the oxygen concentration is low, it is possible to prevent the low rank coal, which is spontaneously oxidized and readily increases in temperature as well as readily catches fire, from catching fire, and dry the coal at higher temperatures. Furthermore, since the nitrogen gas separated in the oxygen separator has a low relative humidity, the coal may be dried with increased efficiency. Furthermore, since waste heat is utilized without requiring additional heat energy, the system may be made environmentally friendly and outstanding in energy-saving efficiency.

(c) It is possible to recycle clean water from the high humidity exhaust gas discharged from the drying unit, thus making effective use of water.

(d) The low rank coal is coarsely crushed, as preprocessing before being dried, into controlled grain sizes of 0.1 μm to 5 mm. Crushing into grain sizes of 0.1 μm to 5 mm may simplify the drying step so as to shorten the time for drying. The low rank coal is heated by heating the drying chamber of the drying unit using a cooling drain water (about 60° C. to 90° C.) pipe of the steam condenser of the steam turbine which generates electric power with the steam superheated in the fluidized bed combustor. Furthermore, as a heat transfer medium, air of a low oxygen content, $CO_2$, or $N_2$ gas exchanges heat with the heated cooling drain water and is heated (to a temperature of 60° C. to 80° C. with RH of 0% to 70%) and is then directed into the drying unit to flow counter to the flow of the low rank coal so as to dry the coal.

(e) As the reformer, a preferable one may employ the moving bed scheme by which the low rank coal is pyrolyzed and gasified while the low rank coal is flowing downwardly and the high-temperature exhaust gas from the fluidized bed combustor is flowing upwardly. The moving bed scheme allows the moving bed to have an elongated reaction time at the moving bed. Furthermore, the counterflow allows for cooling the gas that has been reformed while being heat exchanged with the low rank coal. This makes it possible to obtain a chemical raw material that is made up of a pyrolysis gas and gasification gas as well as to obtain high-calorie reformed coal (char+ash).

(f) In the fluidized bed combustor, employed as a fluidized bed material is limestone or dolomite, etc. As a fuel additive, preferably employed is a gas mixture of oxygen and carbon dioxide gas for adjusting (diluting) the concentration of oxygen. The fuel used is dried coal of the low rank coal that has been dried in the drying unit or reformed coal of the low rank coal that has been reformed in the reformer or char.

(g) The combustion temperature of the fluidized bed combustor is controlled at 800° C. to 900° C. This allows for reducing use of special materials that withstand high temperatures as the furnace material and for preventing troubles such as melting of ash in the fluidized bed.

(h) The catalyst reforming unit performs reforming by allowing the volatile component obtained from the low rank coal or a producer gas (combustion exhaust gas) such as $CO_2$, CO, and $H_2O$ to be brought into contact with the catalyst, thereby yielding, such as, an FT synthesis gas, methanol synthesis gas, ammonia synthesis gas, hydrogen gas, or synthesis natural gas.

Furthermore, a produced tar component may be reformed to continually obtain low molecular-weight hydrocarbon, carbon monoxide, and hydrogen.

The complex system according to a second aspect of the present invention for utilizing coal for manufacture of char and raw material gas and electric power generation is made up of as follows in the first aspect of the invention: a pyrolysis unit for allowing an ascending flow of a combustion exhaust gas of the fluidized bed combustor to decompose the low rank coal supplied from the drying unit at a pyrolysis temperature of 300° C. to 600° C. while the reformer is moving the low rank coal; and a gasification unit for partially decomposing the low rank coal char produced in the pyrolysis unit from fixed carbon into CO and $H_2$ at 600° C. to 800° C.

This arrangement provides the following operations in addition to those of the first aspect:

(1) The dried brown coal may be pyrolyzed into the volatile component+char with the exhaust gas supplied from the fluidized bed combustor, and the char may be further gasified;

(2) Unconverted char and ash are supplied to the fluidized bed combustor so as to combust the char, whereby a high calorie may be obtained, thus providing an outstanding thermal efficiency;

(3) Since the char contains no moisture, it is possible to achieve a high combustion efficiency and considerably reduce heat loss;

(4) Typically, char is difficult to ignite on its own. However, the char is mixed with the dried brown coal so as to produce an ignition volatile component, or preheated to about 800° C. to be combusted in a high oxygen concentration, thereby achieving smooth ignition and combustion;

(5) The decomposing in the two stages of the pyrolysis unit and the gasification unit enables stable char for steelmaking, char as a transportable fuel, and hydrocarbon gas as a chemical raw material to be separated and recycled with high accuracy;

(6) Employing the moving bed scheme allows for elongating the reaction time, thereby reducing troubles such as adhesion due to tar;

(7) It is possible to choose the component of a gas to be extracted by producing a temperature distribution in the reformer or by selecting a point at which the gas is extracted;

(8) The moving bed scheme makes it possible to lower the temperature of the product gas, so that the downstream facility for cooling coal gases, etc., may be eliminated or simplified, thereby making the facility compact;

(9) The gasification in the carbon dioxide gas atmosphere ensures high safety;

(10) Since no nitrogen gas is contained in the produced gas, the coal gas may be separated with ease;

(11) Unlike the fluidized bed in which the temperature in the bed is uniformed, so that the gasification temperature and the temperature of the pyrolysis gas have to be equal to the temperature in the bed, the moving bed makes it possible to bring the combustion exhaust gas at about 800° C. into contact with char at the starting part of the moving bed so as to advance the gasification. In addition, heat absorption and a drop in gas temperature allow for pyrolysis at 300° C. to 600° C. in the middle part of the moving bed while preventing overheating; and

(12) The moving bed may be regulated to temperatures of 100° C. to 300° C. at the uppermost portion depending on the particle bed height. Lowering the temperature of the uppermost portion allows the heavy oil having a relatively high boiling point to be condensed at the upper portion of the particle bed and prevented from being distillated. In addition, the heavy oil may be again pyrolyzed and converted into gas, light oil, and char. To obtain the heavy oil, the temperature of the uppermost portion has to be increased to suppress the condensation of the heavy oil.

Here, the travel speed of the moving bed may be adjusted according to the feed rate of the char to the fluidized bed combustor. Unlike the case of the fluidized bed where particles are completely mixed resulting in the size of char particles having a significant distribution, the char discharged from the moving bed has a uniform size and thus the fluidized bed combustion may be stabilized with ease. The reformer has a two-stage or an integrated structure, in which the combustion exhaust gas of the fluidized bed combustor is supplied at 500° C. to 800° C. from the lower portion.

The complex system according to a third aspect of the present invention for utilizing coal for manufacture of char and raw material gas and electric power generation is adopted in the first or second aspect of the invention such that carbon dioxide gas supplied as a diluent for fuel additive oxygen to the fluidized bed combustor is a carbon dioxide gas discharged and separated from the catalyst reforming unit.

This provides the following operation in addition to those of the first or second aspect:

(1) The carbon dioxide gas discharged from the fluidized bed combustor and the reformer is recycled, thus providing an improved effect of reducing environmental loads.

Advantageous Effects of Invention

As described above, the complex system of the present invention for utilizing coal for manufacture of char and raw material gas and electric power generation provides the following advantageous effects.

The first aspect of the invention provides the following advantageous effects:

(1) Since the low rank coal is dried in the drying unit before being supplied to the reformer, it is possible to suppress the vaporization of the moisture contained in the low rank coal of a high moisture content and the loss of heat energy due to removal of heat by the leakage of steam, etc.;

(2) Since the low rank coal is dried using the exhaust heat emitted from the fluidized bed combustor or the waste heat produced in the power generation cycle, it is possible to utilize heat energy with improved efficiency. On the other hand, when compared with the case where there is provided an additional heat generating unit for generating heat so as to dry the low rank coal, no additional fuel or energy needs to be charged and thus an outstanding energy-saving efficiency is achieved;

(3) The reformer is heated by the exhaust gas from the fluidized bed combustor for reform and gasification, thus achieving an outstanding thermal efficiency;

(4) The low rank coal has a high volatile component content; however, the volatile component and the gasified gas react with CO, $CO_2$, or $H_2O$ of the combustion gas in the gas reform unit, thereby allowing for converting and utilizing the coal as a useful chemical raw material;

(5) Since the temperature of the exhaust gas from the fluidized bed combustor is used for gas reform, an outstanding thermal efficiency and an outstanding energy-saving efficiency are achieved;

(6) The temperature of the product gas to be produced is reduced by employing the moving bed reactor as a pyrolysis and gasification unit, thereby reducing restrictive conditions on the materials such as for gas pipes;

(7) At the same time, the pyrolysis reaction time may be elongated by employing the moving bed. Thus, this prevents troubles due to tar components (such as adhesion or caulking) and makes it possible to obtain a large amount of relatively long-chain hydrocarbon components, allowing for producing a gas advantageous for chemical product synthesis;

(8) Since the fixed carbon with the volatile component removed is charged into the oxygen fluidized bed combustor without cooling, a high ignition quality is achieved and no energy loss results; and (9) Since the high-temperature fixed carbon (char) with the volatile component removed is supplied to the oxygen fluidized bed combustor in a counterflow direction relative to the exhaust gas and thus may be charged into the oxygen fluidized bed combustor from a portion of a low oxygen concentration, abnormal combustion or sudden combustion immediately after the charging may be suppressed, thus allowing oxygen combustion.

The second aspect of the invention provides the following advantageous effects in addition to those of the first aspect:

(1) The dried brown coal is pyrolyzed into volatile components and char with the combustion gas supplied from the fluidized bed combustor, and the char is further gasified;

(2) Unconverted char and ash are supplied to the fluidized bed combustor so as to combust the char, whereby a high calorie may be obtained, thus providing a high thermal efficiency;

(3) Since the char contains no moisture, a high combustion efficiency and no heat loss are achieved;

(4) Typically, char is difficult to ignite on its own. However, the char is preheated to about 800° C. to be combusted in a high oxygen concentration, thereby achieving smooth ignition and combustion;

(5) Employing the moving bed scheme allows for elongating the reaction time, thereby reducing troubles such as adhesion due to tar;

(6) It is possible, by producing a temperature distribution, to choose the component of a gas at a point at which the gas is extracted; and (7) The moving bed scheme for the pyrolysis and gasification unit makes it possible to lower the temperature of the product gas, so that the downstream facility for cooling coal gases, etc., may be eliminated, thereby providing an outstanding energy-saving efficiency and making the facility compact.

The third aspect of the invention provides the following advantageous effects in addition to those of the first or second aspect:

(1) The carbon dioxide gas discharged from the fluidized bed combustor and the reformer is recycled, thus providing an improved effect of reducing environmental loads;

(2) Use of an inert gas for drying, thereby reducing the danger of explosion, etc.; and (3) Since $CO_2$ has a high specific heat, heat may be transferred with ease (i.e., the cooling efficiency is high).

DESCRIPTION OF EMBODIMENTS

Hereinafter, description will be made to the mode for carrying out the present invention with reference to the drawings.

Figure 1:
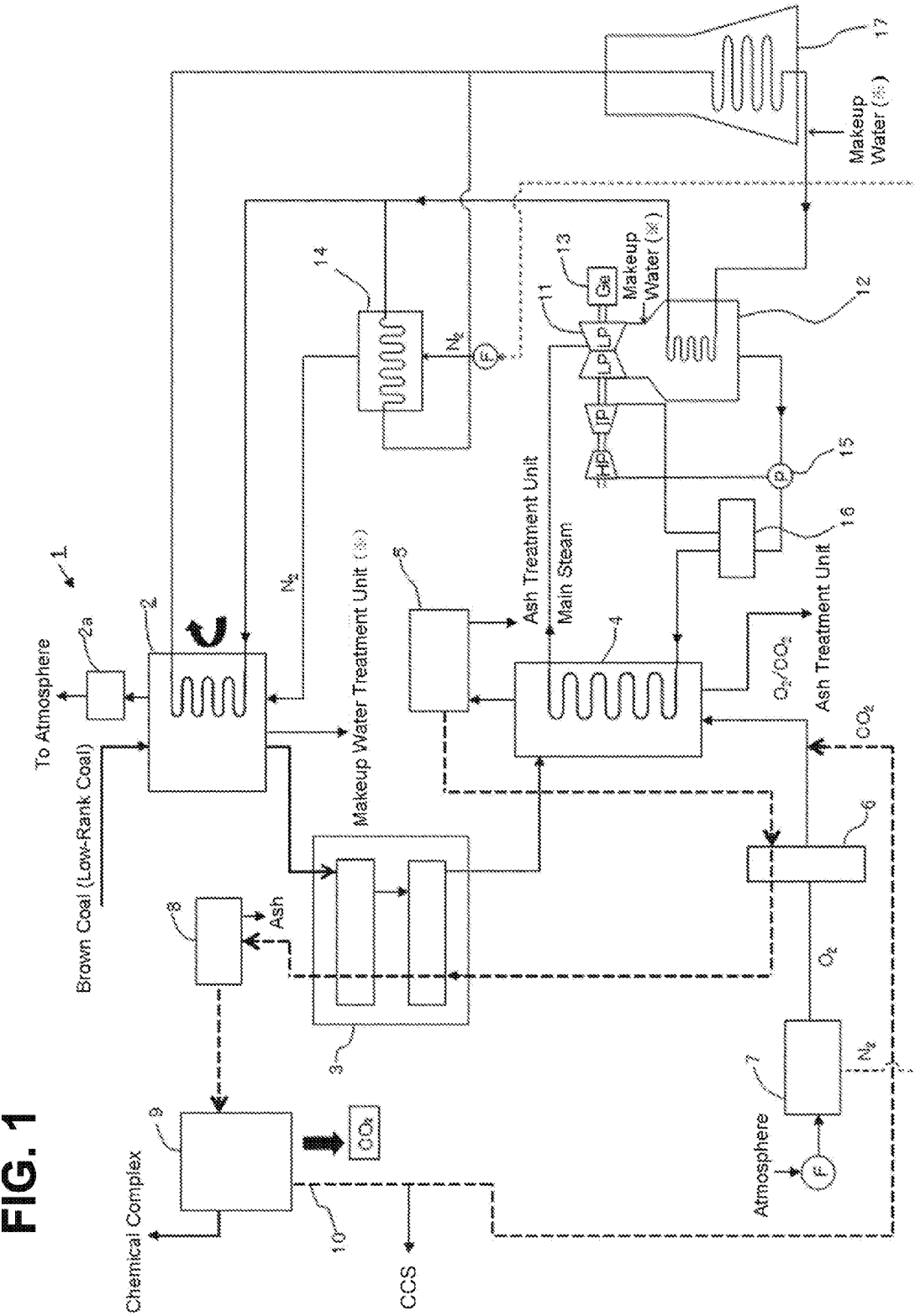
FIG. 1 is a schematic view illustrating a complex system according to an embodiment for utilizing coal for manufacture of char and raw material gas and electric power generation.

FIG. 1 is a schematic view illustrating a complex system according to an embodiment for utilizing coal for manufacture of char and raw material gas and electric power generation.

FIG. 1 shows a complex system 1 for utilizing coal for manufacture of char and raw material gas and electric power generation. The complex system 1 includes a drying unit 2 for drying low rank coal such as brown coal, which is in the shape of lump coal having a grain size of 1 μm to 5 mm and a moisture content of generally 60 mass %, using the gas flow of an inert gas such as air having a low oxygen content or nitrogen of which temperature and relative humidity are controlled at 60° C. to 80° C. and 0% to 70%, respectively. The drying is continued until the moisture content becomes 20 mass %. In this implementation example, the drying chamber of the drying unit 2 includes a pipe for 60° C. to 90° C. hot water connected to a condenser (to be discussed later) for warming the coal, and a gas pipe for injecting an $N_2$ gas into the drying chamber, the $N_2$ gas being separated in an oxygen separator (to be discussed later) and heated in an air preheater (to be discussed later). The moisture in the exhaust gas in the drying unit 2 is recycled by makeup water treatment and supplied to the condenser. The complex system 1 also includes a dust collector 2a for removing dust particles, etc., from the exhaust gas of the drying unit 2. Further included is a reformer 3 that is adopted to reform the low rank coal, which has been dried in the drying unit 2 and transferred in a transfer material, in two-stage reactions of pyrolysis and partial gasification, and vaporize and detach volatile components and tar components, etc., so as to reform the low rank coal into char, ash, and coal gas. The reformer 3 is capable of performing the reform in the two-stage reactions of the pyrolysis and partial gasification, thereby adapting the physical properties of the product char to the requirements for service. Also included are the following: a fluidized bed combustor 4 to which the char and ash reformed in the reformer 3 (hereafter referred to as the reformed coal) is supplied so as to produce main steam for a steam turbine; a cyclone 5 for removing ash from the exhaust gas of the fluidized bed combustor 4; an oxygen preheater 6 for exchanging heat between the exhaust gas separated in the cyclone 5 and the oxygen separated in an oxygen separator (to be discussed later) so as to preheat the oxygen gas; and an oxygen separator 7 for separating the oxygen gas and the nitrogen gas from the atmosphere. The oxygen gas obtained from the oxygen separator 7 is preheated in the oxygen preheater 6 and used as a fuel additive for the fluidized bed combustor 4. Furthermore, the nitrogen gas obtained at the same time is heated and used to dry the low rank coal. Further included are the following: a cyclone 8 for separating ash, etc., from a gasified gas that includes volatile components or tar components gasified with a gasifying agent composed of the exhaust gas from the fluidized bed combustor when the low rank coal is reformed in the reformer 3; a catalyst reforming unit 9 which brings the gasified gas with the ash separated in the cyclone 8 into contact with a catalyst such as zeolite, Fe, Co, Ni, or Cu so as to refine a chemical raw material such as an FT synthesis gas, methanol synthesis gas, ammonia synthesis gas, hydrogen gas, or synthesis natural gas; a carbon dioxide gas pipe 10 for supplying, as a CCS, the combustion exhaust gas or the carbon dioxide gas produced (as a by-product) in the catalyst reforming unit 9 as a diluent for the concentration of the oxygen gas in a carbon dioxide gas reservoir unit and the fluidized bed combustor 4; a steam turbine 11 for rotating a power generator with the main steam of the fluidized bed combustor 4; a condenser 12; a power generator 13; and a drying gas preheater 14 for allowing the very hot water of the condenser 12 to heat the nitrogen gas separated in the oxygen separator 7. The nitrogen gas preheated in the drying gas preheater 14 is fed into the drying unit 2 so as to dehydrate and dry the low rank coal. Also included are the following: a water feed pump 15 for pressurizing feedwater to supply condensate from the condenser 12 into a combustor heat transfer water pipe; a feedwater heater 16 for allowing the steam (extracted vapor) from the turbine to preheat the condensate from the water feed pump 15; and a cooling tower 17.

The complex system, arranged as described above, for utilizing coal for manufacture of char and raw material gas and electric power generation will be described as follows in terms of each unit operation.

(1) The low rank coal is coarsely crushed in advance, e.g., in a ball mill and separated and transferred in an air current, and then supplied to the drying unit 2 of the complex system for utilizing coal for manufacture of char and raw material gas and electric power generation.

(2) In the drying unit 2, a drying gas of a relative humidity of 0% to 70% at a temperature of 65° C. to 110° C. is employed so that the moisture content of the low rank coal with the grain size controlled to 0.1 μm to 5 mm is lowered to 20 mass or less. The drying gas to be employed is the waste heat that is recycled from the steam turbine, the combustor fluidized bed material, and the reformed coal product.

(3) The reformer 3 preferably employs the moving bed scheme by taking slagging measures into account, in the case of which the combustion exhaust gas with the high-temperature portion controlled serves as a pyrolytic and partial gasifying reform agent. This allows for elongating the reaction time and preventing troubles such as caulking of tar components. Furthermore, the cracking of a component having a long carbon chain may be accelerated and as well allowed to serve to cool a product coal gas, thereby facilitating the handling of the produced coal gas.

The reformer may take advantage of a two-stage rotary kiln.

This allows for selecting between direct heating/reform and indirect heating by the combustion gas. The reformed coal may be set by the combustion gas to 600° C. to 500° C. and an inlet dried coal charge temperature of 300° C. to 400° C.

(4) The fluidized bed combustor 4 employs a fuel additive that is obtained by allowing the oxygen separated in the oxygen separator 7, which separates oxygen from atmosphere, to be diluted with the carbon dioxide gas produced (as a by-product) or separated from the catalyst reforming unit 9.

(5) The catalyst reforming unit 9 employs a solid reform catalyst such as iron or an alkaline component. More specifically, it is possible to utilize a fixed bed, etc., which employs a perovskite carrying alkaline earth catalyst. This makes it possible to decompose a heavy component such as a tar component into a light component.

The low rank coal to be employed may be subbituminous coal, low moisture content brown coal (lignite), or high moisture content brown coal (brown coal). The moisture content and heat value thereof are shown in (Table 1).

TABLE 1

| | Coal type | Moisture content (mass %) | Heat value (kcal/kg) | Power generation efficiency: HHV (%) |
|---|---|---|---|---|
| | Bituminous coal | 5 | 6500 | 34.5 |
| Low rank coal | Subbituminous coal | 20 | 5500 | 33.5 |
| | Low moisture content brown coal (Lignite) | 40 | 4000 | 31.2 |
| | High moisture content brown coal (Brown coal) | 65 | 2000 | 28.0 |

The low rank coal moisture is divided into surface adhesion moisture and internal moisture (equilibrium moisture), where the surface adhesion moisture may be dried and removed at 100° C. or less.

The moisture of coal may be reduced to about one-half of the equilibrium moisture by being dried at 80° C. to 150° C. (also referred to as typical drying). However, heating and drying at 150° C. or less reduce the tendency to reform the low rank coal. In this context, the drying unit 2 employed an $N_2$ gas at a temperature of 60° C. to 80° C. with a relative humidity of 0% to 70%.

Next, heating at about 180° C. to 300° C. would cause a hydrophilic oxygen containing group such as the phenol group or the carboxyl group to have a tendency to be pyrolyzed. The internal moisture in the coal is removed by heating, and the hydrophilic oxygen containing group such as the phenol group and the carboxyl group is decomposed to produce $H_2O$ and $CO_2$ and turned to be hydrophobic, resulting in degradation in the hygroscopicity of the coal. Furthermore, the oxygen content in the coal is reduced and thereby inactivated, thus suppressing spontaneous combustion to some extent.

Furthermore, heating to 300° C. or higher causes the equilibrium moisture to start to reduce and considerably reduce at 350° C. or higher to one-half or less of the equilibrium moisture by the typical drying. At this time, the tar component in the coal is liquefied to effuse to the surface through the pores of the coal. From the scanning electron micrograph of the surface and by the measurement of the specific surface area, this may also be seen from the fact that the coal specific surface area is considerably reduced. For example, when raw material coal of a specific surface area of 1.7 $m^2/g$ is heated at 430° C. and then rapidly cooled, the specific surface area is reduced to about 0.1 $m^2/g$.

The tar component which is spread inside the pores and over part of the coal surface and solidified is considered to cause the coal to be reduced in specific surface area and inactivated so as to be degraded in hygroscopicity as well as in spontaneous combustion property. Furthermore, heating over 450° C. to about 500° C. would cause the equilibrium moisture to be further reduced; however, from the scanning electron micrograph and the measurement of the specific surface area, a number of cracks are found on the surface of the coal and the specific surface area sharply increases to about 2.4 $m^2/g$.

Furthermore, when heating over 500° C., the coal tends to have more cracks and become brittle, causing generation of fine powder to increase. In this context, the reformer 3 employing the moving bed makes it possible to prevent the coal from being powderized due to the low-speed heating with the moving bed.

On the other hand, the high moisture content brown coal of a moisture content of 65 mass % has an amount of moisture of about 1×65/(100−65) that is approximately equal to 1.86 kg per 1 kg of dried coal. Thus, since the brown coal of a high moisture content has a moisture loss of 1.86 kg from a chimney and the moisture loss is 650 kcal per 1 kg of water, the moisture loss is 650×1.86=1209 kcal per 1 kg of dried coal. Therefore, the heat quantity that may be converted to steam is 5720−1209=4511 kcal per 1 kg of dried coal. The effectively employable heat quantity ratio of the high moisture content brown coal to the bituminous coal (the heat quantity that may be converted into steam is 5720 kcal) is 4511/5720 that is approximately equal to 79%.

According to Table 1, the high moisture content brown coal provides a power generation efficiency of 28%, and when compared with 34.5% of the bituminous coal (moisture content: 5 mass %), it holds that 28.0/34.5 approximately equal to 81%, which is generally equal to the aforementioned heat quantity ratio. That is, the heat quantity ratio between the two types of coal is equal to the difference between the moisture losses. In this context, to increase the heat quantity of the low rank coal by dehydration reform in order to generate electric power with the low rank coal employed as a fuel, the heat quantity had to be increased by the moisture loss or more, that is, the steam consumption required for treating 1 kg of water was a consumption of 1 kg steam or more according to the conventional dehydration reform method.

In this context, the inventors have intensively made a close study of the complex system for utilizing coal, which is high in calorie and power generation efficiency, for manufacture of char and raw material gas and electric power generation and completed as an invention, the complex system being adopted to vaporize the moisture of the low rank coal with a small amount of heat energy as well as to detach the high volatile component with the energy of the combustion gas so as to utilize the same not as a fuel but as a raw material for chemical products.

Furthermore, an operation method of the system includes the following steps: a grain size control step of controllably crushing low rank coal into grain sizes of about 0.1 μm to 5 mm; a drying step of drying the low rank coal having controlled grain sizes to a moisture content of 20 mass % or less; a reforming step of using an exhaust gas from a fluidized bed combustor to reform the dried coal dried in the drying step; a catalyst reform step of reforming the gasified gas reformed in the reform step to a chemical raw material; a combustion step of combusting, in the fluidized bed combustor, the reformed coal (char and ash) reformed in the reform step so as to produce steam; and a power generation step of generating electric power by the steam. Furthermore, the operation method is achieved by the reform step including a pyrolysis step for pyrolyzing the dried coal and a gasification step of gasifying the pyrolyzed and dried coal. The char that may be excessively produced may be employed as a steelmaking raw carbon material and a transportable solid fuel.

Next, a computer simulation was performed on the heat balance and the material balance of the complex system according to this embodiment for utilizing coal for manufacture of char and raw material gas and electric power generation. As a condition, unworked brown coal of Victorian origin was employed as low rank coal. The initial moisture of the brown coal was 60 mass %, the moisture of dried brown coal when dried in the drying unit 2 was 20 mass %, the fuel ratio was 1.2, and electric power was generated with an efficiency of 30%.

Figure 2:
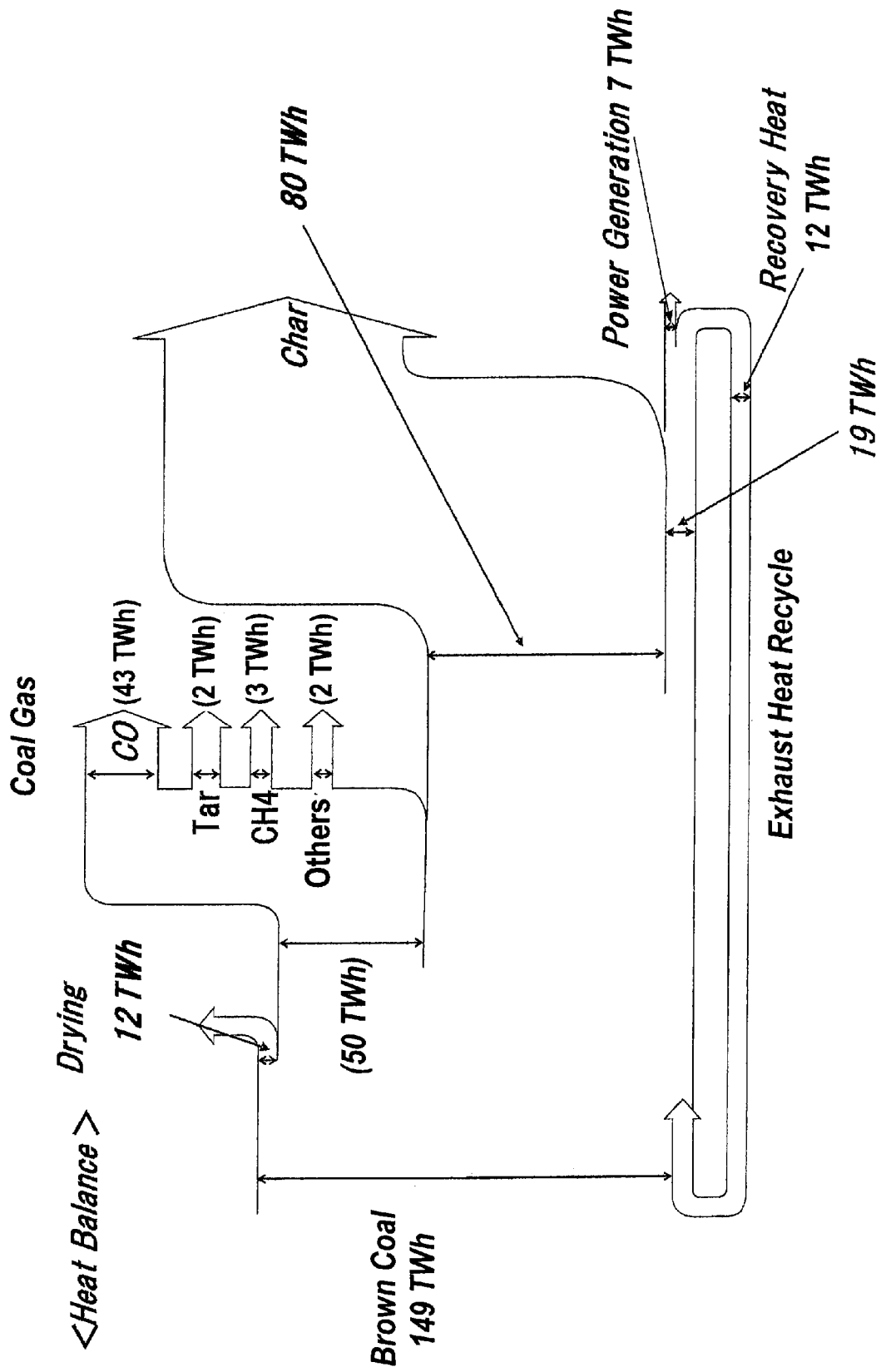
FIG. 2 is a view of heat balance according to an embodiment.
Figure 3:
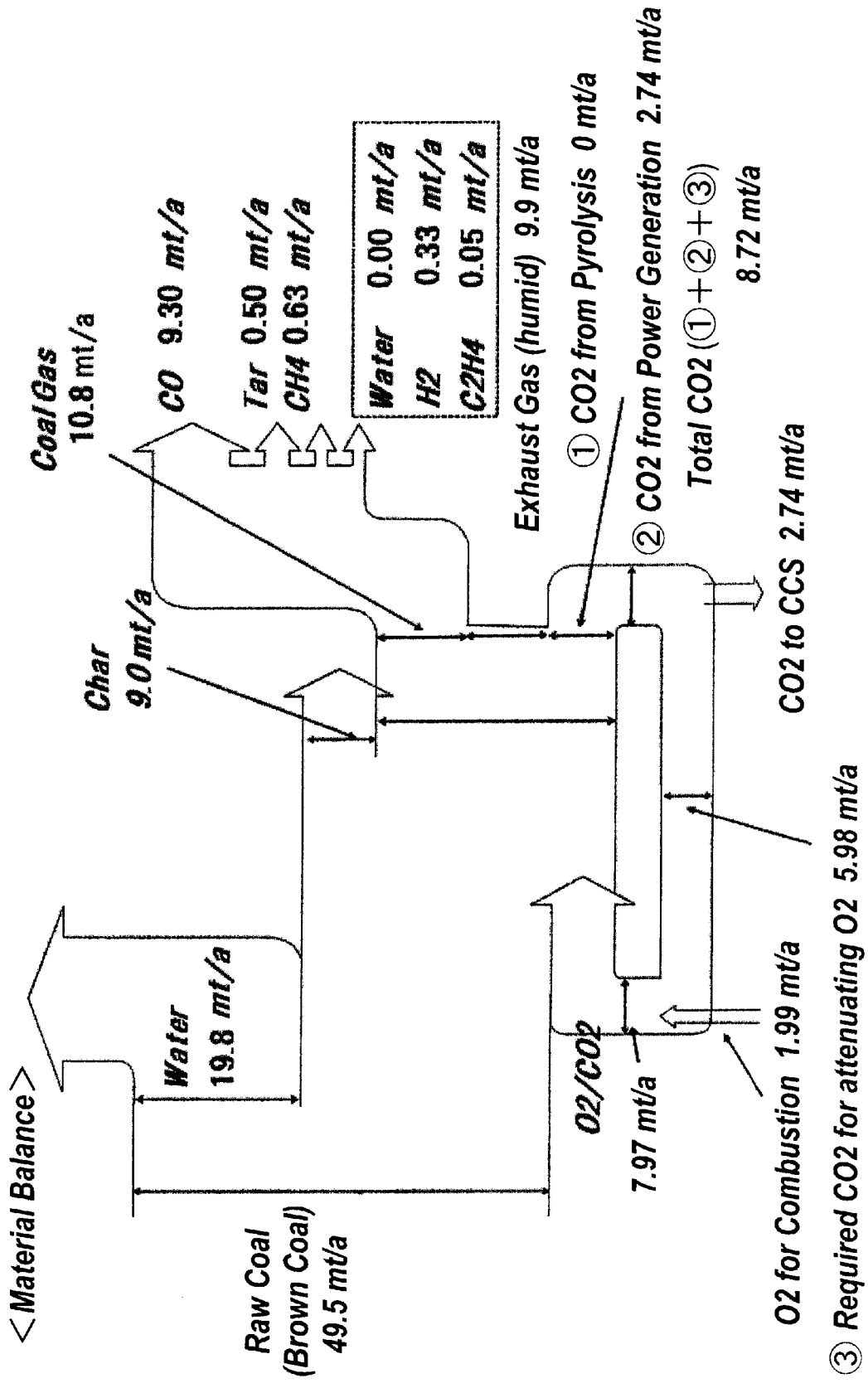
FIG. 3 is a view of material balance according to an embodiment.

The results are shown in FIGS. 2 and 3.

FIG. 2 is a view showing a heat balance according to the embodiment, and FIG. 3 is a view showing a material balance according to the embodiment.

From FIGS. 2 and 3, when the moisture of the fuel brown coal is reduced, the heat energy that may be utilized for electric power generation is increased, that is, the amount of power generation is increased. It is also seen that the exhaust heat that is produced in the power generation process is used for the drying energy, thereby providing increased efficiency. Furthermore, reducing the moisture of the brown coal may cause an increase in the produced retort gas enthalpy, thus achieving a further improved efficiency in the retorting operation. Furthermore, employing $CO_2$ circulation facilitates the recycle of $CO_2$ even when $CO_2$ storage is targeted.

INDUSTRIAL APPLICABILITY

According to the present invention, dried low rank coal is pyrolyzed and gasified, while being moved in a reformer such as the moving bed, by the combustion heat of reformed brown coal in the fluidized bed combustor (FBC) so as to recycle hydrocarbon gas and char, etc., and the reformed char is supplied to the oxygen fluidized bed combustor so as to produce steam for electric power generation, thereby generating electric power and producing $CO_2$ gas at a controlled supply temperature for pyrolysis and gasification. This allows for providing a complex system which is capable of utilizing coal for manufacture of char and raw material gas and electric power generation by merging electric power generation and coal chemistry so as to make full use of heat, electricity, and chemical products.

REFERENCE SIGNS LIST

1: complex system for utilizing coal in manufacture of char and raw material gas and electric power generation
2: drying unit
3: reformer
4: fluidized bed combustor
5: cyclone
6: oxygen preheater
7: oxygen separator
8: cyclone
9: catalyst reforming unit
10: carbon dioxide gas pipe
11: steam turbine
12: condenser
13: power generator
14: drying gas preheater
15: water feed pump
16: feedwater heater
17: cooling tower

The invention claimed is:

1. A system for conversion of coal to char and hydrocarbon gas, comprising:
   a drying unit in communication with an inert gas supply;
   a reformer in communication with the drying unit, the reformer comprising:
      a pyrolysis unit having a counterflow moving bed supplied with downward flowing low rank coal from the drying unit and an ascending flow of the exhaust gas from a fluidized bed combustor,
      a gasification unit in communication with the pyrolysis unit,
      a char and ash transfer in communication with the fluidized bed combustor, and
      a gas outlet in communication with a catalyst reforming unit; wherein
   the fluidized bed combustor comprises:
      a supply of oxygen and carbon dioxide,
      an ash outlet and
      an exhaust gas outlet in communication with the reformer; and
   the catalyst reforming unit comprises:
      a solid reform catalyst,
      an outlet for reformed hydrocarbon,
      a carbon dioxide exhaust pipe in communication with the fluidized bed combustor and
      a gas inlet in communication with the reformer.

2. The system for conversion of coal according to claim 1, wherein
   a temperature of the pyrolysis unit is from 150° C. to 600° C.; and
   a temperature of of the gasification unit is from 600° C. to 800° C.

3. The system for conversion of coal according to claim 1, further comprising an oxygen separator which supplies oxygen to the fluidized bed combustor and nitrogen as an inert gas to the drying unit.

4. The system for conversion of coal according to claim 1, wherein the fluidized bed combustor comprises limestone or dolomite as a fluidized bed material and a temperature of the fluidized bed combustor is from 800° C. to 900° C.

5. A method for conversion of low rank coal to char and hydrocarbon gas employing the system for conversion of coal of claim 1, comprising:
   crushing the low rank coal to a grain size of 0.1 μm. to 5 mm;
   drying the crushed low rank coal to a maximum moisture content of 20% by mass or less under flow of an inert gas at a temperature of from 60° C. to 90 °C. in the drying unit to obtain a crushed coal;
   transferring the crushed coal to the reformer;
   pyrolyzing and contacting the crushed coal with an exhaust gas from the fluidized bed combustor in the reformer to obtain a combined pyrolysis and gasification gas and a reformed coal comprising char and ash;
   transferring the reformed coal to the fluidized bed combustor;
   transferring the combined pyrolysis and gasification gas to the catalyst reforming unit;
   combusting the char in the fluidized bed combustor with a supply of oxygen diluted with carbon dioxide at a temperature of from 800° C. to 900° C.; and
   reforming the combined pyrolysis and gasification gas in the catalyst reforming unit to obtain the hydrocarbon gas.

* * * * *